United States Patent [19]

Howe et al.

[11] 3,898,379

[45] Aug. 5, 1975

[54] MEANS FOR REDUCING EFFECT OF LOW FREQUENCY COMPONENT OF VIDEO SIGNAL

[75] Inventors: Michael Bernard Howe; Charles Raymond William Richardson, both of Chelmsford, England

[73] Assignee: Elliott Brothers (London) Limited, London, England

[22] Filed: Jan. 9, 1974

[21] Appl. No.: 431,852

[52] U.S. Cl. .... 178/7.1; 178/DIG. 34; 178/DIG. 39

[51] Int. Cl. .............................................. H04n 5/14

[58] Field of Search............... 178/7.1, 7.2, DIG. 25, 178/DIG. 34, DIG. 39

[56] References Cited

UNITED STATES PATENTS 3,643,011 2/1972 Engel et al. .................. 178/DIG. 34

3,780,215 12/1973 Shibata et al. ............... 178/DIG. 34

FOREIGN PATENTS OR APPLICATIONS 2,048,851 5/1971 Germany ..................... 178/DIG. 25

*Primary Examiner*—Robert L. Richardson

*Attorney, Agent, or Firm*—Baldwin, Wight & Brown

[57] ABSTRACT

A television system is provided with circuitry which improves the quality of the video signals obtained under viewing conditions which usually have resulted in poor quality pictures being obtained. The circuitry removes any very low frequency component which is superimposed on the video signal without significantly reducing the useful information content of the video signals. The undesirable low frequency component arises particularly when a hazy scene is viewed or even when the camera is subjected to shock or vibration.

12 Claims, 2 Drawing Figures

MEANS FOR REDUCING EFFECT OF LOW FREQUENCY COMPONENT OF VIDEO SIGNAL

Figure 1:
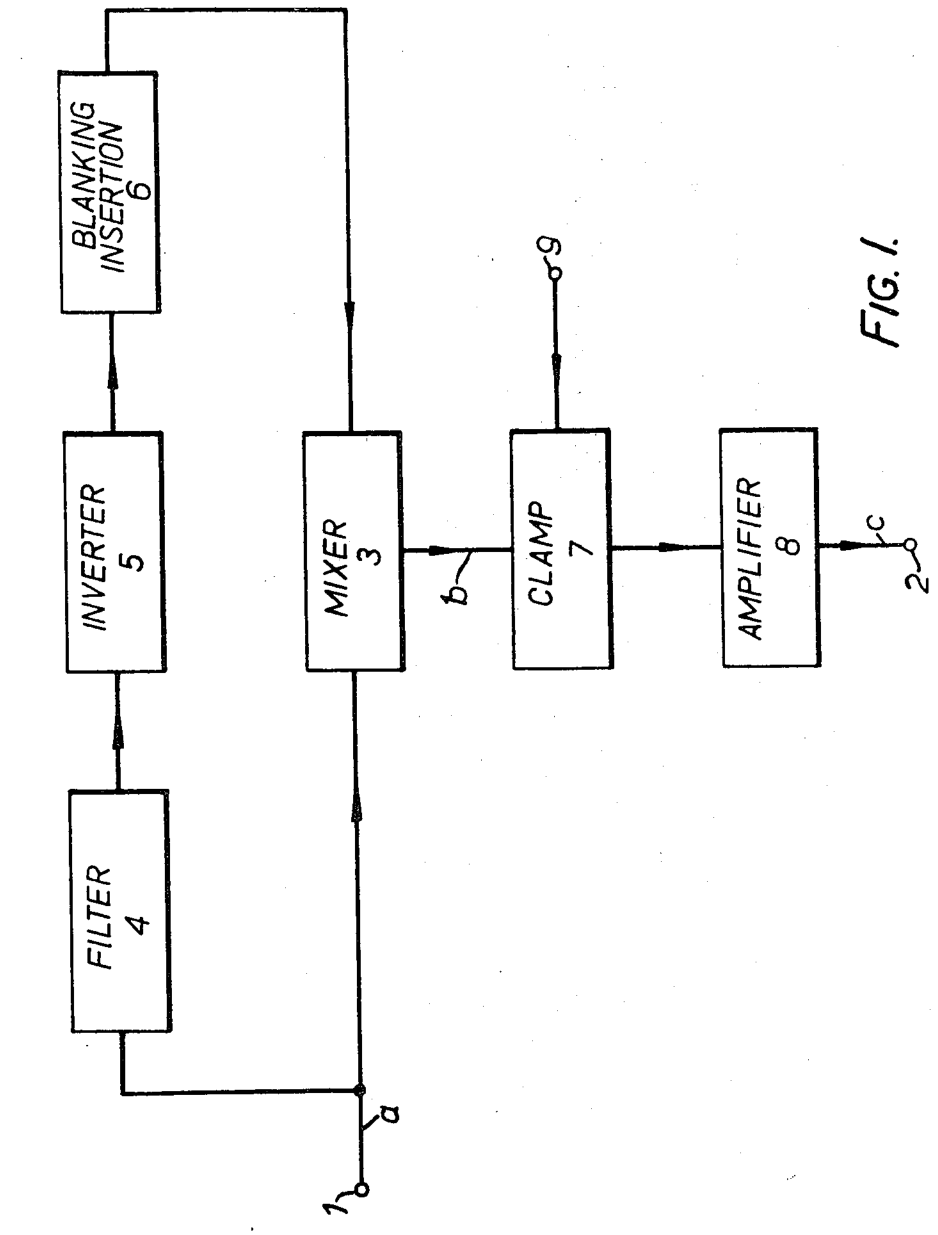

This invention relates to television systems.

Often it is found that the quality of a reproduced television scene falls short of that which may be expected having regard to the inherent capabilities of the system. This has been observed where the distant view of an external scene is subject to haze or where areas of a scene are relatively bright due, for example, to reflection.

The prime object of this invention is to provide an improved television system in which the tendency for inferior reproduction to be obtained in conditions such as the above, is reduced.

According to this invention in its broadest aspect a television system includes means for processing the video signal to reduce the effects of relatively low frequency modulation signals superimposed thereon due to haze of relatively bright areas in the viewed scene.

It has been found that not only can processing the video signal to reduce the effects of superimposed relatively low frequency signals result in an improvement in the quality of a reproduced scene viewed in conditions of haze or where areas of the scene are relatively bright, but also the quality of the reproduced scene may be less affected by mechanical shock or vibration of the viewing television camera.

The frequencies of the superimposed signals which are reduced may be of the order of tens of cycles per second but in some cases signals of frequencies of the order of hundreds of cycles per second may be reduced. As will be appreciated however the higher the upper limit of the frequency range of signals reduced the greater will be the tendency for certain picture detail to be lost, although the great majority of useful picture information is of very much higher frequency than the frequency of signals the reduction of which will be found to reduce the effects described.

The simple expedient of passing the received video signals through a filter designed to pass only the high frequency components is generally not satisfactory since in a television system the video signal needs to be related to a constant d.c. reference level.

According to a feature of this invention a television system includes means for extracting from received video signals said superimposed low frequency modulation signals, and means for subsequently recombining the extracted signals with the said received video signals so as to cancel therefrom the said low frequency modulation signals.

Preferably the said means for extracting from the received video signals the low frequency modulation signals superimposed thereon comprises a low pass filter. Preferably again the extracted low frequency modulation signals are inverted prior to recombination with the said received video signals, so that a simple additive recombination may be used resulting in algebraic cancellation of the low frequency modulation signals.

Preferably again means are provided for clamping the level of the recombined signal to any desired d.c. level.

In conventional television systems line blanking signals are present in the video signals, and these are removed or distorted when the low frequency modulation signals are extracted, and consequently the blanking signals are preferably reinserted prior to the recombination step. Each blanking signal consists of a predetermined d.c. level.

Figure 2:
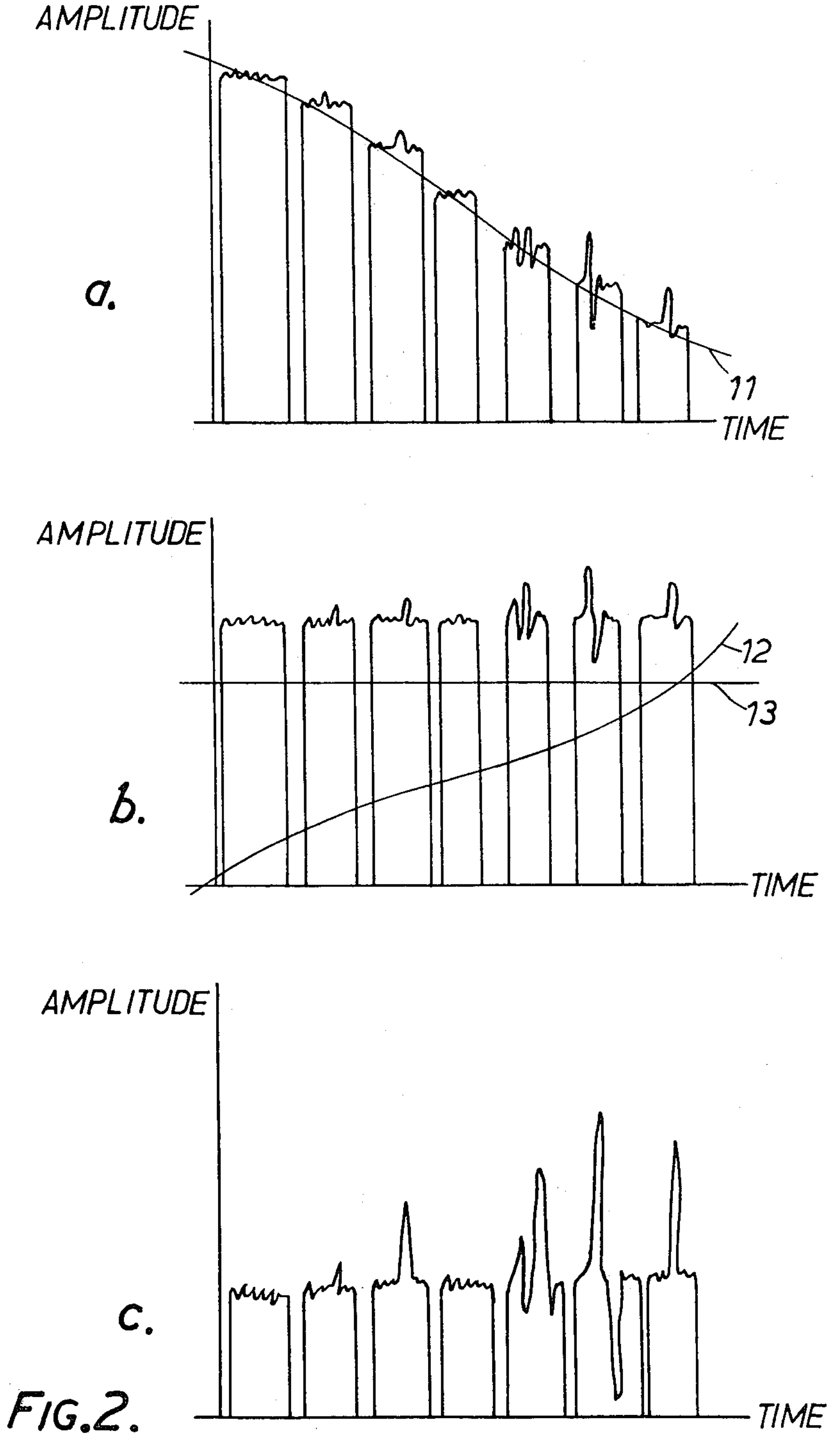

The invention is furthr described, by way of example, with reference to the accompanying drawings in which;

FIG. 1 illustrates in diagrammatic form a television system in accordance with the present invention, and FIG. 2 contains explanatory diagrams relating to the operation of the television system of FIG. 1.

In FIG. 1 there is shown only those parts of the television system necessary for an understanding of the present invention. Before considering FIGS. 1 and 2 in detail it will, it is thought, be useful to consider the general nature of a video signal such as is the concern of the present invention. The video signal represents, in well known manner, a scene scanned by a television camera, and contains high frequency components representative of the smallest elemental area of the scene which can be discriminated; that is to say, the high frequency components are related to the resolution with which the scene is viewed. Careful consideration of the video signal will disclose the unwanted modulation with which the present invention is concerned. This is a relatively low frequency signal including components having frequencies generally not in excess of one order of magnitude greater than the frame frequency of the television system, and are frequently less. The modulation signal in question has been found to arise when, for example, a landscape or a seascape is viewed from a considerable distance under conditions in which the picture detail is superimposed on a hazy background consisting of, for example, a bright horizon and a progressively darker foreground. This latter effect is particularly troublesome when a scene is televised by airborne equipment. The television system in accordance with the invention extracts such unwanted modulations and provides an output signal consisting essentially of only the useful video signal.

Referring now to FIGS. 1 and 2, the television system shown in FIG. 1 consists of a mixer 3 one input of which is connected directly to an input terminal 1. Input terminal 1 is also connected via a filter circuit 4, a signal inverter 5 and a blanking insertion circuit 6 to another input of the mixer 3. Output signals from the mixer 3 are fed via a clamping circuit 7 to a video signal amplifier 8 which provides amplified signals to an output terminal 2. Clamping signals are applied to clamping circuit 7 via terminal 9.

FIG. 2 consists of three diagrams, *a*, *b* and *c*, each of which represents the waveforms present at the points like referenced in FIG. 1. FIG. 2*a* thus represents the signal received at terminal 1 and it is assumed in this instance that it results from the televising of a rather hazy scene. The diagram represents a single field period and the horizontal portions of the signal between the vertical straight lines represent the line blanking periods. The envelope of the signal represents high frequency signals corresponding to a few large objects present in the televised scene superimposed on the unwanted low frequency modulation represented by the broken line 11. The peak at the left of the diagram, representing the top of a viewed scene, represents a bright hozizon line. The average illumination of the scene decreases towards the near foreground and hence the line 11 drops towards the right of the diagram, whilst the clarity of the picture detail, represented by the wanted high frequency signal, increases. The received video signal is passed through filter 4 which is a low pass filter having a cut-off frequency several times that of the field frequency. This eliminates the wanted video signal (since the wanted video signal relates to scene detail and consists of the higher frequency components). The line blanking signals are also removed or distorted by this filter. Inverter 5 inverts the low frequency envelope 11 passed by filter 4 and blanking insertion circuit 6 reinserts the d.c. level blanking signals in the correct places.

The mixer 3 produces the signal shown in diagram b of FIG. 2. The signal consists of three parts, the inverted signal from blanking insertion circuit 6 between the ground line and line 12, and the original unwanted unmodified modulation above line 12 on which is superimposed the wanted video signal, the last two components being, of course, those received directly from terminal 1. By passing this composite signal through the clamp circuit 7, adjusted via terminal 9 to clamp at a level just below the general run of line 13, only the wanted video signal is passed to the amplifier 8. The amplified video signal is shown in diagram *c* of FIG. 2.

Thus the wanted video signals may be amplified as desired without an attendant amplification of unwanted modulations. Where, as in the present example, the viewed scene is very hazy, this means that objects, such as distant buildings or ships, which would otherwise be indistinguishable in the haze may be more clearly seen when reproduced on a viewing monitor.

Other unwanted low frequency modulations, resulting from mechanical shock or vibration, to which sensitive parts of the television system, notably the camera, are subject may be eliminated (or at any rate reduced) by suitable choice of the characteristics of the filter 4 and of the clamping level of the clamping circuit 7. The clamping circuit 7 may be no more than a d.c. bias circuit, the bias level being controllable by means of the signal applied to terminal 9.

The invention is especially useful where it is necessary to transmit the video signal over some kind of transmission path for further processing as only the useful video signal need be transmitted and it may be amplified to a greater extent, often significantly greater, prior to transmission, than would otherwise be the case, and consequently the video signal may be transmitted over greater distances and/or received with improved fidelity.

We claim:

1. A television system including means for processing the picture content of the video signal to reduce the effects of relatively low frequency modulation signals having a frequency substantially less than the television line frequency which modulation signals are present due to haze or relatively bright areas in the viewed scene.

2. A television system as claimed in claim 1 and including means for extracting from received video signals said superimposed low frequency modulation signals, and means for subsequently recombining the extracted signals with the said received video signals so as to cancel therefrom the said low frequency modulation signals.

3. A system as claimed in claim 2 wherein said means for extracting from the received video signals the low frequency modulation signals superimposed thereon comprises a low pass filter.

4. A system as claimed in claim 2 wherein the extracted low frequency modulation signals are inverted prior to recombination with the said video signals, whereby a simple additive recombination results in algebraic cancellation of the low frequency modulation signals.

5. A system as claimed in claim 2, wherein means are provided for clamping the level of the recombined signal to any desired d.c. level.

6. A system as claimed in claim 2, wherein blanking signals are reinserted into said extracted signals prior to the recombination step.

7. In a television system including a video signal input which may contain successive line data signals which, within a field period, define a low frequency signal envelope which includes components having frequencies generally not in excess of one order of magnitude greater than the field frequency of the television system, the combination of:

- low pass filter means connected to said video signal input for producing an output approximating said low frequency signal envelope;
- combining means for combining said video signal input with said output of the low pass filter means to produce a composite signal in which said successive line data signals are present substantially in the absence of interference by said low frequency components beyond a selected d.c. level;
- means for recovering only that portion of said composite signal beyond said selected d.c. level; and
- means for amplifying the recovered signal.

8. In a television system as defined in claim 7 wherein said combining means includes an inverter.

9. In a television system as defined in claim 7 wherein said means for recovering comprises a clamp circuit clamping said composite signal to said selected d.c. level.

10. In a television system as defined in claim 7 wherein said combining means includes on insertion circuit for inserting gaps in said envelope caused by blanking periods between said successive line data signals.

11. In a television system as defined in claim 10 wherein said means for recovering comprises a clamp circuit clamping said composite signal to said selected d.c. level.

12. In a television system as defined in claim 11 wherein said combining means includes an inverter.

* * * * *

UNITED STATES PATENT AND TRADEMARK OFFICE

CERTIFICATE OF CORRECTION

PATENT NO. : 3,898,379

DATED : August 5, 1975

INVENTOR(S) : Michael Bernard Howe and Charles Raymond William Richardson

It is certified that error appears in the above-identified patent and that said Letters Patent are hereby corrected as shown below:

Insert in the patent heading:

[30] Foreign Application Priority Data

Jan. 9, 1973 Great Britain 1162/73

Signed and Sealed this

*thirtieth* Day of *September 1975*

[SEAL]

*Attest:*

RUTH C. MASON
*Attesting Officer*

C. MARSHALL DANN
*Commissioner of Patents and Trademarks*